Nov. 24, 1942.  G. A. TINNERMAN  2,303,148
NUT FASTENED INSTALLATIONS
Filed March 24, 1941
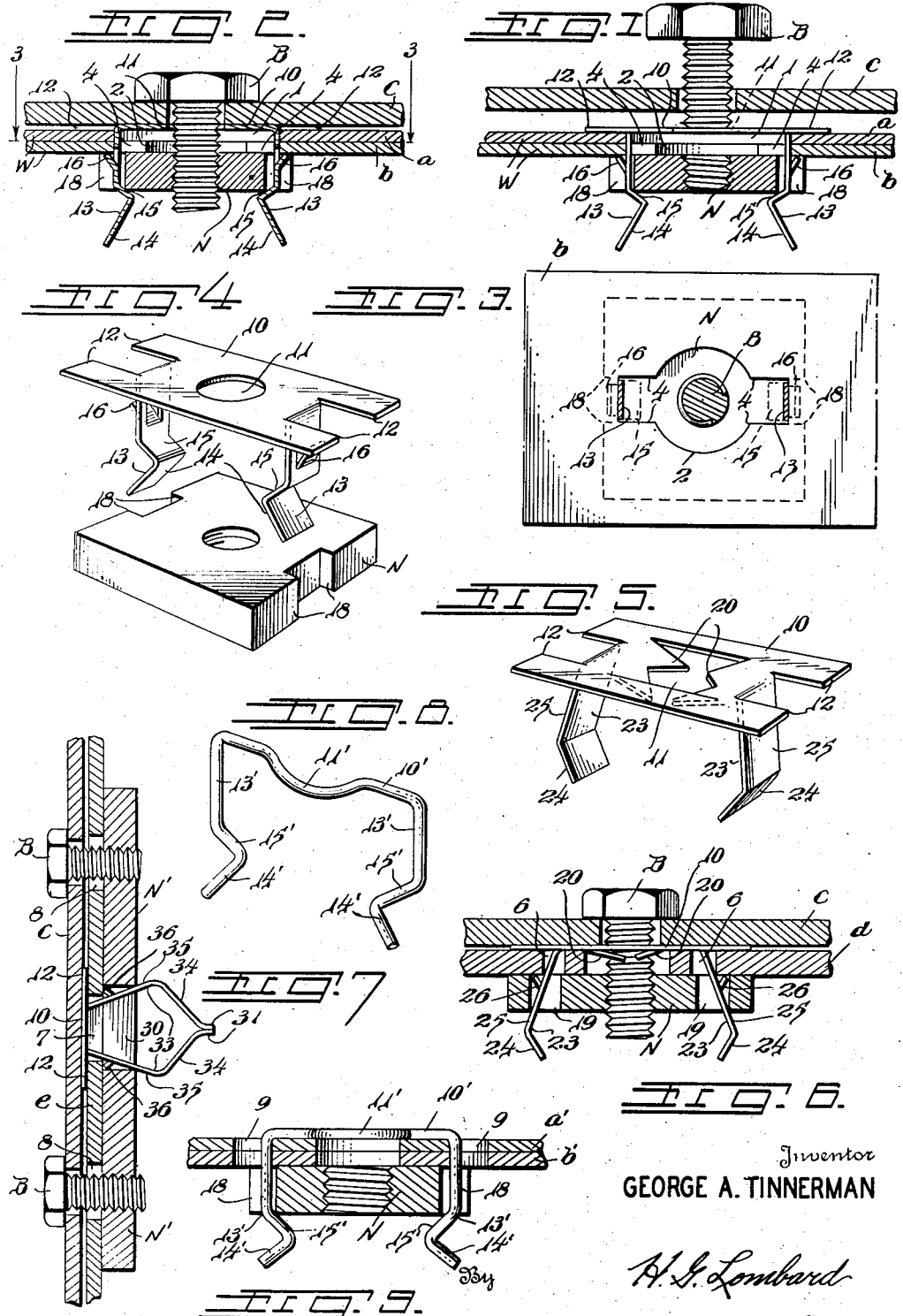
Inventor
GEORGE A. TINNERMAN Patented Nov. 24, 1942

2,303,148

UNITED STATES PATENT OFFICE 2,303,148

NUT FASTENED INSTALLATIONS

George A. Tinnerman, Cleveland, Ohio, assignor to Tinnerman Products, Inc., Cleveland, Ohio, a corporation of Ohio Application March 24, 1941, Serial No. 385,026

21 Claims. (Cl. 85—32)

This invention relates, in general, to new and useful improvements in fastening installations of the character wherein a conventional threaded nut or equivalent tapped plate is attached in position over a bolt opening in a panel or similar supporting member preparatory to the application of a cooperating bolt or screw thereto for securing the parts of an installation.

In many installations, it is necessary or desirable to use a standard nut and bolt fastening means but it is usually a difficult problem, especially in blind locations, for the operator to hold the nut in place as the bolt is applied thereto and otherwise, maintain the nut against rotation during the final tightening of the bolt therewith. In practically any installation in which the rearward side of a part is not conveniently or readily accessible for holding the nut in fastening position during the application of the bolt thereto, it is necessary to resort to some form of riveting, welding or other attaching means for retaining the nut in fastening position.

In the average installation requiring a cheap, inexpensive nut holding means, the cost of welding a nut in place or riveting cage or clinch-on nut holding devices to a supporting part generally is so expensive as to make the use thereof prohibitive, while such arrangements otherwise are objectionable and disadvantageous in requiring an entirely inordinate amount of time for attaching the same in fastening position in an installation. A primary object of the present invention, therefore, is to provide various forms of such attaching means in the manner of simple nut holding clips which are relatively cheap and inexpensive to manufacture, strong, durable, light in weight, and adapted for quick and easy application to fastening position in an assembly in a minimum of time and effort.

A further object of the invention is for the provision of various improved forms of nut holding means for conventional or standard threaded nuts, tapped plates, or the like, comprising a metallic clip device, or the like, having an improved attaching means defining a pair of arms adapted for simple and effective substantial snap fastening engagement with a nut to retain the same in position on a part to be secured, and further, as a means adapted for temporarily securing a plurality of parts in assembled relation preparatory to the application of a bolt to the attached nut for fastening a cooperating member or part to such assembled parts.

Another object of the invention is to provide a nut holding clip of the kind described embodying integral means having a pronounced thread locking action with the associated bolt thread in a manner to prevent reverse movement or loosening of the bolt from tightened fastening position as a result of vibration, strain and jarring effects in a completed installation.

A further object is to provide a nut fastened installation embodying a detachable nut holding clip that may be readily removed from any supporting panel assembling aperture without injury or distortion of the clip, and again attached for use in the same or similar installation.

Still another object is to produce a detachable nut holding clip adapted to provide a waterproof and dust-proof connection with the supporting panel surface when the bolt nut or tapped plate is attached thereby in fastening position for receiving a cooperating bolt.

Further objects and advantages, and other new and useful features in the construction, arrangement and general combination of parts of the invention will be readily apparent to those skilled in the art as the description thereof proceeds with reference to the accompanying drawing, for purposes of illustration but not of limitation, in which like reference characters designate like parts throughout the same, and in which:

Fig. 1 is a sectional view of an assembly embodying one form of the invention with the bolt fastening shown about to be applied to fastening position;

Fig. 2 is a view similar to Fig. 1 showing the bolt fastening in applied fastening position;

Fig. 3 is a sectional view of Fig. 2 taken on line 3—3, looking in the direction of the arrows; and, Fig. 4 shows in perspective the nut holding clip of Figs. 1-3 and the nut or tapped plate provided for use therewith in accordance with the invention;

Fig. 5 is a perspective view of another form of nut holding clip employed in a further embodiment of the invention;

Fig. 6 is a sectional view of an assembly including the clip of Fig. 5 and showing the bolt in applied fastening position;

Fig. 7 is a vertical section of an installation embodying a plurality of bolt fastenings applied to a tapped plate attached in accordance with the invention.

Fig. 8 is a perspective of a wire nut holding clip; and,

Fig. 9 is a sectional view of an assembly embodying the nut holding clip of Fig. 8.

The instant invention contemplates, in general, the provision of a relatively inexpensive means for attaching a conventional nut or equivalent tapped plate onto a part to be secured by a very simplified arrangement making for speed and economy in assembly line installations and related present day mass production methods. In the use of a nut holding clip as distinguished from a cage device which is welded, riveted or otherwise permanently attached to a part to be secured, the present invention is advantageous in that the several parts of the fastening installation may be much more easily and quickly assembled and, if necessary or desirable, readily disassociated without mutilating or distorting the nut holding device such that it may be employed again in the same or similar fastening installation.

A further advantageous feature resides in the fact that the nut holding clip together with the nut is especially suited as a temporary or removable work fastening means for retaining the parts of an assembly in proper relation preparatory to the application of bolt fastenings for finally securing such parts in a completed installation. In this respect, while the attachment may be provided in any of several forms, in each case the nut holding clip is so constructed as to positively hold the nut or equivalent tapped plate under pronounced spring force on the part to be secured while otherwise having provision for holding the nut against turning upon application of the bolt thereto and during the final tightening operation.

Referring now, more particularly, to the drawing, Figs. 1-4 inclusive show the application and use of one form of the improved nut holding clip of the invention. As best seen in Fig. 4, the clip may be provided from a relatively small, inexpensive blank of any suitable sheet metal material, preferably tempered spring metal or cold rolled metal having spring-like characteristics. The blank is so provided as to define a base 10 having a bolt passage 11, spaced extensions or head sections 12, and an integral spring arm 13 on either side of said base. Said spring arms are bent to extend in the same general direction from said base in generally parallel and spaced relation and have their free ends bent outwardly to define tapering guide surfaces 14 merging into inwardly extending nut holding shoulders 15. Preferably, clip retaining elements are provided on the spring arms 13 for retaining the clip in initially attached relation with the work, and, in the present example, such elements are shown provided in the manner of struck-out fingers 16, or the like, adapted to cooperate with the head sections or extensions 12 in engaging opposite faces of the work substantially as shown in Figs. 1 and 2.

The nut N, or equivalent tapped plate, is provided on opposing sides with recesses 18 adapted to receive the spring arms 13 of the clip in fixed, non-rotatable relation therewith, thereby preventing turning of the nut upon insertion of the bolt and rotation thereof to tightened fastening position. It will be understood the nut or equivalent tapped plate may be of any suitable size or shape and of squared, hexagonal or other polysided configuration and the function of which when attached to the rearward side of the supporting work W, is to serve as the means cooperating with a bolt or screw applied from the forward side thereof for securing the installation. The work W may comprise a single thickness part or a plurality of work pieces a, b, having aligned apertures 1, 2, respectively, substantially as shown. Preferably, one of said apertures includes lateral slots 4, Fig. 3, receiving the spring arms 13 of the clip in order to prevent rotation of the assembled nut and clip relative to the work W upon application of the bolt, as presently to be described.

In any event, the spring arms 13 of the clip are received in said aligned apertures 1, 2, with the extremities of the fingers 16 engaging the adjacent rearward face of the work in cooperation with the extensions 12 of the base 10 engaging the opposite face thereof to serve the dual purpose of maintaining the work pieces a, b, in proper assembled relation, and locking the clip in initially applied position prior to attachment of the nut N, or equivalent tapped plate, or the like. This arrangement is particularly important in certain assembly line methods of manufacture, for example, inasmuch as the clip may be applied by one operator in initially assembling the parts a, b, with the assurance that such parts will be in proper assembled relation and the clips will not fall off or become dislodged by the time the assembly is ready for the next operation of attaching the nuts N in position.

With a clip thus initially secured to the work W, the nut N is applied in a manner whereby the free ends of the spring arms 13 are received in the opposing recesses 18 on the nut and, upon pressure on the nut to slide the same along the tapering guide surfaces 14 thereof, there is effected a gradual outward expansion of said spring arms 13 as necessary to permit the nut to pass the bends defining the shoulders 15, whereupon the engaged corners of the nut ride on said shoulders 15 to be dispoesd in close, snug engagement with the adjacent face of the work. During this application of the nut to the spring arms of the clip, the clip need not be supported since the retaining elements 16 lock the clip against reverse movement and withdrawal from initially applied position, as aforesaid.

The nut holding shoulders 15 are preferably provided in the form of inclined cam surfaces, as shown, in order to accommodate nuts of various thicknesses while also compensating for manufacturing variations therein and tolerances in the associated work pieces a, b. In application, such cam shoulders 15 are adapted to contact the engaged corners of the nut N under progressively increasing spring force in a manner whereby the nut is automatically seated in firm, rigid engagement against the rearward face of the work. The arrangement otherwise is such that the nut is easily and quickly snapped into fastening engagement with the spring arms 13 of the clip and positively held thereby under continuously effective spring force against any accidental displacement or unintentional removal. In addition, the degree of holding action of the spring arms 13 with the nut is such as to serve admirably as a temporary fastening means for holding the parts a, b, in position prior to application of the bolt B to the nut thus attached. Of course, if a more positive attachment is desired, the shoulders 15 of the spring arms may be made sharp or more pronounced to engage the adjacent face of the nut over a substantial area in providing an effectively locked relation therewith.

The nut holding arrangement just described is adapted for use in various ways preparatory to the application of the bolt B for securing the parts of the installation. Thus, the clip and attached nut may serve as temporary fastening means for the parts a, b, prior to application of the bolt to secure the same directly together in which event, the head of the bolt would bear on the base 1 of the clip and would be of sufficient size or a washer provided to overlap the aperture 1 in the adjacent part a. In a further relation, a separate member c may be secured by the bolt to the work pieces a, b, substantially as shown in Fig. 2, it being understood, of course, that such work may just as well be a single part having the combined thickness of said parts a, b.

In any event, the clip and nut are attached to the work W in a manner whereby the nut is held against turning upon threading of the bolt therewith, and, in the present example, this is provided for by the lateral slots 4, Fig. 3, which receive the spring arms 13 of the clip. Rotative movement of the clip relative to the work is thereby prevented, while the nut otherwise is held against displacement from the clip or turning with the bolt by the adjacent portions of said spring arms 13 which are received in the opposed recesses 18 on the sides of the nut.

It will therefore be seen that the nut holding arrangement of the present invention is one in which the nut not only is easily and quickly attached by a simple snap fastening action with the spring arms of the clip in a minimum of time and effort, but also, embodies a construction wherein the nut is fixedly retained in fastening position in such a way that the bolt may be applied from one side of the work without requiring the operator to hold the nut at the opposite side thereof either during initial insertion of the bolt or in the final tightening thereof. The arrangement thus is admirably suited for use in blind locations or in any assembly of parts in which the rearward side thereof is not conveniently or readily accessible for holding a nut or equivalent tapped plate in the final securing of an installation or in completing a joint or connection in a structure.

Figs. 5 and 6 disclose another form of the invention wherein the nut or equivalent tapped plate device N, Fig. 6, is provided with recesses 19 on either side of the threaded bolt passage therein for cooperation with the spring arms of a clip which is similar in purpose and use to that described with reference to Figs. 1–4 inclusive. The clip, as shown in Fig. 5, comprises a base 10 having spaced head sections or extensions 12 and a bolt passage 11 similar to that of Fig. 4 or defined by spaced, cooperating bolt thread engaging tongues 20, or the like, struck and formed from the sheet metal base for a purpose presently to be described.

The spring arms 23 of the clip are bent intermediately to form guide surfaces 24 in diverging relation and inclined shoulder portions 25 in converging relation toward the base 10 of the clip. The spring arms thus provided are bowed generally outwardly to each other and may be flexed inwardly to be received in spaced apertures 6 in the supporting part d with the portions of the shoulder surfaces 25, adjacent the base 10, in resilient engagement with the outer corners of said apertures 6 to retain the clip in initially applied position prior to attachment of the nut or tapped plate. If desired, fingers 26, or the like lug elements may be struck and formed or otherwise provided on the spring arms 25 for positively retaining the same in applied position in said apertures 6 in the support substantially as shown in Fig. 6. The nut is attached easily and quickly by passing the spring arm guide surfaces 24 through the spaced recesses 19 therein to the position in which the lower corners of said recesses ride on the inclined cam shoulders 25, thereby automatically seating the nut snugly against the adjacent face of the supporting part d under continuously effective spring tension of said spring arms 23.

The bolt B may then be inserted to secure a cooperating member c thereto by an operation taking place entirely from the side the bolt is applied inasmuch as the nut is held against turning by the spring arms of the clip extending through the spaced apertures 6 in the supporting part d and through the spaced recesses 19 in the nut or tapped plate. The cam shoulder portions 25 of the resilient spring arms 23 engages in the recesses 19 of the nut under a pronounced spring force which is sufficient to hold the nut fixedly and rigidly in attached position for all ordinary practical purposes, but if positive locking engagement is desired, such shoulders may be formed in the manner sharp and well defined abutments engaging increased areas at the face of the nut substantially in the manner described with reference to the nut holding shoulders 15 shown in the device of Figs. 1–4 inclusive.

Figs. 5 and 6 also illustrate a further teaching of the invention directed to a bolt locking means which may be embodied in either of the described forms of the invention in the provision of the necessary bolt passage 11 in the base 10 of the clip. The bolt passage 11, accordingly, may be provided in the manner of integral, resilient bolt or screw thread engaging tongues 20, or the like, having spaced extremities concentrically arranged with respect to the screw threaded bolt passage in the associated nut, and otherwise aligned therewith in position for threadedly engaging the threads of the bolt under a pronounced binding action to serve as a locking means therefor preventing loosening of the bolt from tightened position as a result of vibration, strain and jarring effects in a completed installation.

Said thread engaging means 20 may be pressed, stamped, extruded or otherwise provided from the sheet metal base 10 of the clip in any suitable form of construction so long as the same threadedly engage with the bolt threads. In this respect, the present invention fully contemplates the provision of such thread engaging means in various other related forms as in the manner of a substantial perforated hub pressed from the sheet metal and which is shaped to provide a helical thread or otherwise tapped to provide a plurality of threads for threadedly engaging the bolt. However, it has been found that such thread engaging means prepared in the form of cooperating, yieldable tongues as shown, are the most efficient and the most practical in that they are possessed of unusual inherent strength and will not collapse or pull through, nor loosen from effective thread locking engagement with the bolt even under extreme conditions of strain and vibration. This takes place by reason of the fact that the sheet metal material of the base from which such tongues are formed, is of less thickness than the pitch or spacing of the threads of the bolt or screw, wherefore such tongues in moving toward each other to engage the bolt threads, cut into the grooves intermediate adjacent threads and otherwise become embedded in the root diameter of the bolt in locked, biting or frictional fastening engagement therewith in any position. In the present example, such tongues are shown as extending downwardly out of the plane of the sheet metal base 10 in substantial ogee formation and provided with notched extremities forming substantial biting jaws designed to cut uniformly into the bolt shank and adjacent thread surfaces thereon in positive locking relation therewith in the most effective manner. It is to be understood, however, that the present invention in no manner or form is limited to the specific construction shown of the thread engaging means but rather, comprehends also various related forms of locking tongues or equivalent thread engaging elements.

If desired, said tongues may be provided with arcuate or rounded extremities corresponding substantially to the root diameter of the bolt shank to engage a thread convolution around the major portion of its periphery in providing for the most effective uniform threaded engagement with the bolt. Preferably, said extremities of the tongues are spaced in normal untensioned relation a distance somewhat less than the root diameter of the bolt, and otherwise so designed that when the bolt is threadedly engaged therewith, considerable strain is set up in the tongues to cause the extremities thereof to bind against the bolt shank between adjacent thread surfaces in providing the desired thread locking action on the bolt.

Fig. 7 shows a further embodiment of the invention comprising a clip for attaching a plurality of nut elements in the form of a tapped plate N' having spaced threaded bolt passages and an assembling recess 30 receiving the clip. The clip may be constructed in the same general character as in the previously described forms of the invention to comprise a base 10, extensions 12 and spring arms 33 having their extremities 31 in abutting relation to add stiffness and rigidity thereto. Said spring arms 33 are bent intermediately to define diverging guide surfaces 34 and inclined shoulder portions 35. The shank of the clip thus assumes a substantially diamond-shaped formation which may be compressed as necessary to pass through an aperture 7 in a supporting part e with the adjacent shoulder portions 35 of said spring arms in resilient engagement with the corners of said aperture to retain the clip in initially applied position. If desired, fingers 36, or the like, may be struck and formed or otherwise provided on said spring arms 33 for positively retaining the clip in such initially applied position similarly to the previously described forms of the invention.

The tapped plate N' may then be attached, with the spaced threaded bolt passages therein in registration with correspondingly spaced preperforated openings 8 in the supporting part e, simply by snapping the spring arms 33 of the clip into the assembling recess 30 in the tapped plate to a position in which the lower corners of said recess 30 ride on the inclined cam shoulders 35 of the spring arms in such a way that the tapped plate is seated automatically in fixedly and rigidly attached position against the adjacent face of the supporting part e. A cooperating part or member c may then be secured thereto by bolts B without requiring access to the rearward side of the assembly. In the event it is desirable to eliminate any possibility of lateral displacement of the tapped plate from attached position, the aperture 7 and the recess 30 may be provided in the manner of aligned slots the sides of which are adapted to engage the edges of the spring arms 33 of the clip and thereby retain the tapped plate against any turning or lateral shifting which would move the threaded bolt passages therein out of registration with the bolt openings 8 in the supporting part. The cam shoulder portions 35 of the resilient spring arms 33 engage in the recess 30 of the tapped plate under a continuously effective spring force which is sufficient to hold the same fixedly and rigidly in attached position for all ordinary practical requirements, but if a positive locking engagement is desired, such shoulders may be formed in the manner of pronounced abutments to engage an increased area of the outer face portions of the tapped plate N' adjacent said assembling recess 30 therein.

Figs. 8 and 9 disclose a further embodiment of the invention wherein the nut holding clip is formed of wire and is generally similar in structure, purpose and use to the device of Figs. 1-4 inclusive. A substantial mid-portion of a wire strip defines a base 10' having a bent portion 11' providing a bolt passage and resilient free end portions defining spring arms 13'. Said spring arms are bent intermediately to define nut holding shoulders 15' and diverging guide surfaces 14'. The clip, accordingly, may be employed for holding the nut N in an assembly in the manner of Fig. 1, for example, or otherwise, as illustrated in Fig. 9 wherein the spring arms extend through spaced apertures 9 in superposed work pieces a', b', and are received in the recesses 18 on the sides of the nut with the nut holding shoulders 15' camming the engaged corners of the nut to hold the same fixedly and rigidly in attached position, substantially as described with reference to Figs. 1-4 inclusive.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. In an assembly for attaching a nut device in bolt receiving position on an apertured part, a nut holding clip comprising a metallic body defining a base and spring arms depending from said base, said arms having free end portions adapted to pass through said part to project from the outer side thereof with said base of the clip at the opposite side of said part, said nut device being recessed to receive the projecting free end portions of said arms at the outer side of said part, shoulders on said arms adapted for snap fastening engagement with the nut device to hold the same in bolt receiving position, and guide surfaces on said arms facilitating application of the nut device to such bolt receiving position.

2. In an assembly for attaching a nut device in bolt receiving position on an apertured part, a nut holding clip comprising a sheet metal body defining a base and spring arms depending from said base, said arms having free end portions adapted to pass through said part to project from the outer side thereof with said base of the clip at the opposite side of said part, means on said arms to maintain the clip in applied position on said part, and means defined by the projecting free end portions of said spring arms at the outer side of said part for engaging the nut device to hold the same in bolt receiving position on said part.

3. In an assembly for attaching a nut device in bolt receiving position on an apertured part, a nut holding clip comprising a sheet metal body defining a base and spring arms depending from said base, said arms being adapted to pass through said part to project from one side thereof with said base of the clip at the opposite side of said part, means on said arms to maintain the clip in applied position on said part, said nut device being recessed to receive the projecting portions of said arms in such applied position, and means defined by said projecting portions of the arms for engaging the nut device to hold the same in bolt receiving position on said part.

4. In an assembly for attaching a nut device in bolt receiving position on an apertured part, a nut holding clip comprising a sheet metal body defining a base and spring arms depending from said base, said arms having free end portions adapted to pass through said part to project from the outer side thereof with said base of the clip at the opposite side of said part, locking elements on said arms to maintain the clip in applied position on said part, and shoulders on the projecting free end portions of said arms at the outer side of said part adapted for snap fastening engagement with the nut device to hold the same in bolt receiving position on said part.

5. In an assembly for attaching a nut device in bolt receiving position on an apertured part, a nut holding clip comprising a sheet metal body defining a base and spring arms depending from said base, said arms being adapted to pass through said part to project from one side thereof with said base of the clip at the opposite side of said part, finger elements on said arms to maintain the clip in applied position on said part, said nut device being recessed to receive the projecting portions of said arms in such applied position, shoulders on said projecting arm portions adapted for snap fastening engagement with the nut device to hold the same in bolt receiving position, and guide surfaces formed from the free ends of said arms facilitating application of the nut device to such bolt receiving position.

6. In an assembly for attaching a nut device in bolt receiving position on an apertured supporting part, a nut holder comprising a sheet metal body defining a base and arms depending from said base, said arms being adapted to pass through said part to project from one side thereof with said base of the nut holder at the opposite side of said part, means defined by the projecting portions of said spring arms for engaging the nut device to hold the same in bolt receiving position on said part, and means carried by said base of the nut holder for locking a bolt applied to the nut device to secure a member to said supporting part.

7. In an assembly for attaching a nut device in bolt receiving position on an apertured supporting part, a nut holder comprising a sheet metal body defining a base and spring arms depending from said base, said arms being adapted to pass through said part to project from one side thereof with said base of the nut holder at the opposite side of said part, shoulders defined by the projecting portions of said spring arms adapted for snap fastening engagement with the nut device to hold the same in bolt receiving position on said part, and means carried by said base of the nut holder for locking a bolt applied to the nut device to secure a member to said supporting part.

8. In an assembly for attaching a nut device in bolt receiving position on an apertured supporting part, a nut holder comprising a sheet metal body defining a base and spring arms depending from said base, said arms being adapted to pass through said part to project from one side thereof with said base of the nut holder at the opposite side of said part, said nut device being recessed to receive the projecting portions of said arms, means defined by said arms for engaging the nut device to hold the same in bolt receiving position on said part, and means carried by said base of the nut holder providing thread locking engagement with a bolt applied to the nut device for securing a member to said part.

9. In an assembly for attaching a nut device in bolt receiving position on an apertured supporting part, a nut holder comprising a sheet metal body defining a base and spring arms depending from said base, said arms being adapted to pass through said part to project from one side thereof with said base of the nut holder at the opposite side of said part, means on said arms to maintain the nut holder in applied position on said part, shoulders defined by the projecting portions of said spring arms for resiliently engaging the nut device to hold the same in bolt receiving position, and integral resilient bolt thread engaging elements provided from said base of the nut holder adapted for thread locking engagement with a bolt applied to the nut device for securing a member to said part.

10. In an assembly for attaching a nut device in bolt receiving position on an apertured supporting part, a nut holder comprising a sheet metal body defining a base and spring arms depending from said base, said arms being adapted to pass through said part to project from one side thereof with said base of the nut holder at the opposite side of said part, means on said arms to maintain the nut holder in applied position on said part, said nut device being recessed to receive the projecting portions of said arms, shoulders defined by said spring arms adapted for snap fastening engagement with the nut device to hold the same in bolt receiving position, guide surfaces on said arms facilitating application of the nut device to such bolt receiving position, and integral resilient tongues, or the like, provided from said base of the nut holder adapted for thread locking engagement with a bolt applied to the nut device for securing a member to said part.

11. In an assembly for attaching a nut device in bolt receiving position on a part provided with a bolt opening and an aperture on either side of said bolt opening, a nut holding clip comprising a sheet metal body defining a base and spring arms depending from said base, said arms being receivable in said apertures to pass through said part and project from one side thereof with said base of the clip at the opposite side of said part, said nut device being recessed to receive the projecting portions of said arms of the clip in applied position, shoulders defined by the projecting portions of said arms adapted for snap fastening engagement with the nut device to hold the same in bolt receiving position, and diverging guide surfaces on said arms adjacent said shoulders facilitating application of the nut device to such bolt receiving position.

12. In an assembly for attaching a nut device in bolt receiving position on a part provided with a bolt opening and spaced apertures adjacent said opening, a nut holding clip comprising a sheet metal body defining a base and spring arms depending from said base, said arms being receivable in said spaced apertures to pass through said part from one side thereof with said base of the clip at the opposite side of said part, said nut device having spaced recesses receiving the projecting portions of said arms, and said arms being bent to define shoulders adapted for snap fastening engagement with the nut device to hold the same in bolt receiving position on said part.

13. In an assembly for attaching a nut device in bolt receiving position on an apertured supporting part, a nut holder comprising a sheet metal body defining a base and a pair of spring arms depending from said base said arms being adapted to pass through said part to project from the outer side thereof with said base of the nut holder at the opposite side of said part, said nut device having one or more threaded bolt passages and a recessed portion adapted to receive the projecting portion of at least one of the spring arms of said shank, and shoulders defined by said arms of the shank at the outer side of said part adapted for snap fastening engagement in said recessed portion of the nut device to hold the same in bolt receiving position on said part.

14. In an assembly for attaching a nut device in engagement with a side of an apertured part for receiving a bolt or screw fastening applied thereto from the opposite side of said part, a nut holding clip comprising a base and spring arms depending from said base adapted to pass through said part to project from the nut-engaged side thereof with said base of the clip at said opposite side of said part, the projecting portions of said spring arms at the nut-engaged side of said part in the applied position of the clip having shoulders engaging the nut device with a snap fastening action to hold the nut in bolt receiving position on said part.

15. In an assembly for attaching a nut device in bolt receiving position on an apertured part, a nut holding clip comprising a body of sheet material defining a base and spring arms depending from said base, said arms having free end portions adapted to pass through said part to project from the outer side thereof with said base of the clip at the opposite side of said part, said nut device being recessed to receive the projecting free end portions of said spring arms at the outer side of said part and said free portions having shoulders engaging the nut at the base of the recesses by substantial snap fastening action.

16. In an assembly for attaching a nut device in bolt receiving position on an apertured part, a nut holding clip comprising a metallic body defining a base and a pair of arms depending from said base, said arms having free end portions adapted to pass through said part to project from the other side thereof with said base of the clip at the opposite side of said part, and means defined by the projecting free end portions of said arms at the outer side of said part in applied position engaging the nut device with a snap fastening action to hold the nut in bolt receiving position on said part.

17. In an assembly for attaching a nut device in bolt receiving position on an apertured part, a nut holding clip comprising a metallic body defining a base and spring arms depending from said base, said arms having free end portions adapted to pass through said part to project from the outer side thereof with said base of the clip at the opposite side of said part, a nut device recessed to receive the projecting free end portions of said arms at the outer side of said parts, and means formed on said arms resiliently engaging the nut device to hold the same in bolt receiving position on said part.

18. In an assembly for attaching a nut device in bolt receiving position on an apertured part, a nut holding clip comprising a metallic body defining a base and spring arms depending from said base, said arms having free end portions adapted to pass through said part to project from the outer side thereof with said base of the clip at the opposite side of said part, a nut device recessed to receive the projecting free end portions of said arms at the outer side of said part, and shoulders on said arms having snap fastening engagement with the nut device to hold the same in bolt receiving position.

19. In an assembly for attaching a nut device in bolt receiving position on an apertured part, a nut holding clip comprising a sheet metal body defining a base and spring arms depending from said base, said arms having free end portions adapted to pass through said part to project from the outer side thereof with said base of the clip at the opposite side of said part, means on said arms to maintain the clip in applied position, and the projecting free end portions of said spring arms at the outer side of said part in applied position having shoulders making a snap fastening engagement with the nut device to hold the same in bolt receiving position on said part.

20. In an assembly for attaching a nut device in bolt receiving position on an apertured part, a nut holding clip comprising a strip of sheet material with a base portion and a pair of integral spring arms bent from the base, the arms having free end portions adapted to pass through said part to project from the outer side thereof, the projecting free end portions of said arms being bent first inwardly and then outwardly to provide a guide to facilitate placing the nut and provide retaining shoulders having spring engagement with the nut.

21. In an assembly for attaching a nut device in bolt receiving position on an apertured part, a nut holding clip comprising a strip of sheet material with a flat portion defining a base and a pair of integral spring arms bent from the base back of the ends thereof so that the base projects beyond the arms, the arms having free end portions adapted to pass through said part to project from the opposite side thereof with the projecting end portions of the base engaging the outer side, the projecting arms furnishing retaining shoulders having a spring engagement with the nut.

GEORGE A. TINNERMAN.